United States Patent
Parker et al.

[11] Patent Number: 5,983,642
[45] Date of Patent: Nov. 16, 1999

[54] COMBUSTOR WITH TWO STAGE PRIMARY FUEL TUBE WITH CONCENTRIC MEMBERS AND FLOW REGULATING

[75] Inventors: David Marchant Parker, Oviedo; Graydon Lane Whidden, Orlando, both of Fla.; Wendel Zolyomi, Lawrenceville, Ga.

[73] Assignee: Siemens Westinghouse Power Corporation, Orlando, Fla.

[21] Appl. No.: 08/949,252

[22] Filed: Oct. 13, 1997

[51] Int. Cl.⁶ .................................................... F02C 9/20
[52] U.S. Cl. .................................. 60/737; 60/742; 60/748; 431/9; 431/354; 431/8; 239/403; 239/556; 239/549
[58] Field of Search ............................ 60/732, 737, 739, 60/740, 742, 746, 747, 748; 431/8, 9, 354; 239/403, 549, 556, 413, 417.5

[56] References Cited

U.S. PATENT DOCUMENTS

| | | | |
|---|---|---|---|
| 2,978,870 | 4/1961 | Vdoviak | 60/741 |
| 3,973,390 | 8/1976 | Jeroszko | 60/733 |
| 4,305,255 | 12/1981 | Davies et al. | |
| 4,499,735 | 2/1985 | Moore et al. | 60/746 |
| 4,715,538 | 12/1987 | Lingnau | 239/556 |
| 4,751,815 | 6/1988 | Moore | 60/749 |
| 5,101,633 | 4/1992 | Keller et al. | 60/742 |
| 5,295,352 | 3/1994 | Beebe et al. | 60/742 |
| 5,307,636 | 5/1994 | Shekleton et al. | 60/742 |
| 5,319,935 | 6/1994 | Toon et al. | 60/737 |
| 5,323,614 | 6/1994 | Tsukahara et al. | |
| 5,359,847 | 11/1994 | Pillsbury et al. | 60/39.06 |
| 5,361,586 | 11/1994 | McWhirter et al. | 60/737 |
| 5,415,000 | 5/1995 | Mumford et al. | 60/747 |
| 5,479,782 | 1/1996 | Parker et al. | |
| 5,699,667 | 12/1997 | Joos | 60/737 |
| 5,797,267 | 8/1998 | Richards | 60/737 |
| 5,813,846 | 9/1998 | Newby et al. | 431/9 |

FOREIGN PATENT DOCUMENTS

| | | |
|---|---|---|
| 08128636 | 5/1996 | Japan. |
| 08261465 | 10/1996 | Japan. |

*Primary Examiner*—Ted Kim

[57] ABSTRACT

A combustor for a gas turbine having a centrally located fuel nozzle and inner, middle and outer concentric cylindrical liners, the inner liner enclosing a primary combustion zone. The combustor has an air inlet that forms two passages for pre-mixing primary fuel and air to be supplied to the primary combustion zone. Each of the pre-mixing passages has a circumferential array of swirl vanes. A plurality of primary fuel tube assemblies extend through both pre-mixing passages, with each primary fuel tube assembly located between a pair of swirl vanes. Each primary fuel tube assembly is comprised of two tubular members. The first member supplies fuel to the first pre-mixing passage, while the second member, which extends through the first member, supplies fuel to the second pre-mixing passage. An annular fuel manifold is divided into first and second chambers by a circumferentially extending baffle. The proximal end of the first member is attached to the manifold itself while the proximal end of the second member is attached to the baffle. The distal end of the first member is attached directly to the second member at around its mid-point. The inlets of the first and second members are in flow communication with the first and second manifold chambers, respectively. Control valves separately regulate the flow of fuel to the two chambers and, therefore, to the two members of the fuel tube assemblies, thereby allowing the flow of fuel to the first and second pre-mixing passages to be separately controlled.

19 Claims, 4 Drawing Sheets

COMBUSTOR WITH TWO STAGE PRIMARY FUEL TUBE WITH CONCENTRIC MEMBERS AND FLOW REGULATING

REFERENCE TO GOVERNMENT CONTRACTS

Development for this invention was supported in part by a U.S. Department of Energy contract. Accordingly, the United States government may have certain rights in the invention, including a paid-up license in this invention and the right in limited circumstances to require the patent owner to license others on reasonable terms as may be provided for by the terms of contract DE-FC21-95MC32267 awarded by the Department of Energy.

BACKGROUND OF THE INVENTION

The present invention relates to a combustor for burning fuel in compressed air. More specifically, the present invention relates to a combustor in which fuel is introduced by fuel tubes into two pre-mixing passages.

In a gas turbine, fuel is burned in compressed air, produced by a compressor, in one or more combustors. Traditionally, such combustors had a primary combustion zone in which an approximately stoichiometric mixture of fuel and air was formed and burned in a diffusion type combustion process. Additional air was introduced into the combustor downstream of the primary combustion zone. Although the overall fuel/air ratio was considerably less than stoichiometric, the fuel/air mixture was readily ignited at start-up and good flame stability was achieved over a wide range of firing temperatures due to the locally richer nature of the fuel/air mixture in the primary combustion zone.

Unfortunately, use of such approximately stoichiometric fuel/air mixtures resulted in very high temperatures in the primary combustion zone. Such high temperatures promoted the formation of oxides of nitrogen ("NOx"), considered an atmospheric pollutant. It is known that combustion at lean fuel/air ratios reduces NOx formation. However, achieving such lean mixtures requires that the fuel be widely distributed and very well mixed into the combustion air. This can be accomplished by introducing the fuel into the combustion air in both primary and secondary annular passages so that the fuel and air are pre-mixed prior to their introduction into the combustion zones.

It has been found that mixing of the primary fuel and combustion air is enhanced by using two primary pre-mixing passages. Fuel is introduced into these passages by a number of fuel spray tubes, or "pegs," that extend through the two passages and that are distributed around their circumference. A combustor of this type is shown in U.S. Pat. No. 5,479,782 (Parker et al.), hereby incorporated by reference in its entirety.

Unfortunately, such fuel tubes do not allow the fuel introduced into the two primary pre-mixing passages to be individually regulated. This lack of control prevents optimization of the combustion dynamics.

It is therefore desirable to provide a combustor, such as that suitable for use in a gas turbine, in which the flow of fuel to multiple primary pre-mixing passages can be individually controlled.

SUMMARY OF THE INVENTION

Accordingly, it is the general object of the current invention to provide a combustor, such as that suitable for use in a gas turbine, in which the flow of fuel to multiple pre-mixing passages can be individually controlled.

Briefly, this object, as well as other objects of the current invention, is accomplished in a combustor for combusting a flow of fuel in a flow of oxygen bearing fluid, such as compressed air. The combustor comprises (i) first and second passages for mixing first and second portions of the fuel flow in first and second portions of the flow of oxygen bearing fluid, respectively, and (ii) means for introducing the fuel flow into first and second portions of the flow of oxygen bearing fluid. According to the current invention, the first passage has an inlet for receiving the first portion of the oxygen bearing fluid flow, while the second passage has an inlet for receiving the second portion of the oxygen bearing fluid flow. The fuel introducing means comprises two members, a first member having means for introducing the first portion of the fuel flow into the first passage and a second member having means for introducing the second portion of the fuel flow into the second passage. The second member of the fuel introducing means extends through the first member of the fuel introducing means.

In a preferred embodiment, the combustor further comprises means for individually regulating the flow rate of the first portion of the fuel flow introduced by the first portion of the fuel introducing means and the flow rate of the second portion of the fuel flow introduced by the second portion of the fuel introducing means. In this embodiment, the fuel flow introducing means comprises a plurality of fuel introducing assemblies, each of which comprises first and second members. The first members are dispersed about the first passage, while the second members are dispersed about the second passage. A first chamber distributes the first portion of the fuel flow to the plurality of first members and a second chamber distributes the second portion of the fuel flow to the plurality of second members. The flow of fuel to the two chambers can be individually regulated by control valves.

DESCRIPTION OF THE PREFERRED EMBODIMENT

Figure 1:
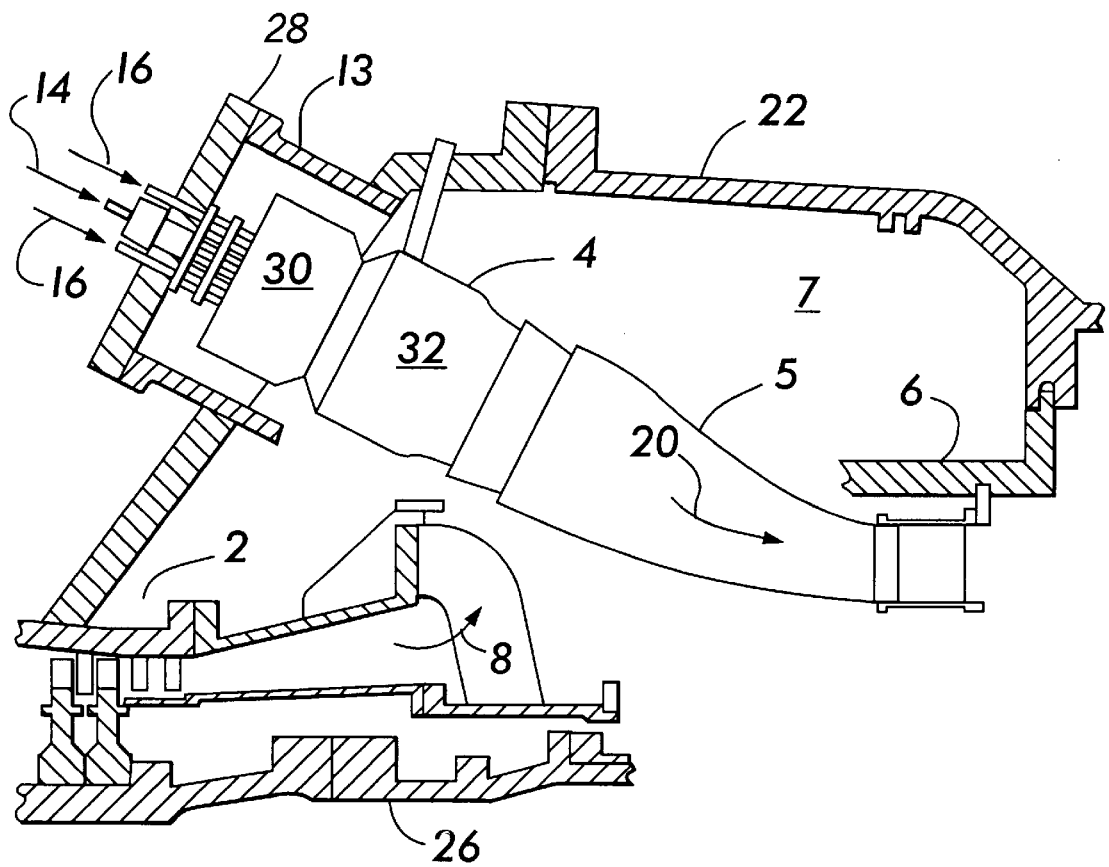
FIG. 1 is a longitudinal cross-section through the combustion section of a gas turbine.

Referring to the drawings, there is shown in FIG. 1 the combustion section of a gas turbine. As is conventional, the gas turbine is comprised of a compressor 2 that is driven by a turbine 6 via a shaft 26. Ambient air is drawn into the compressor 2 and compressed. The compressed air 8 produced by the compressor 2 is directed to a combustion system that includes one or more combustors 4 disposed within a chamber 7 formed by a cylindrical shell 22. In the combustors 4, gaseous or liquid fuel is burned in the compressed air 8, thereby producing a hot compressed gas 20. Each combustor has a primary zone 30 and a secondary zone 32. The hot compressed gas 20 produced by the combustor 4 is directed to the turbine 6 by a duct 5 where it is expanded, thereby producing shaft horsepower for driving the compressor 2, as well as a load, such as an electric generator. The expanded gas produced by the turbine 6 is exhausted, either to the atmosphere directly or, in a combined cycle plant, to a heat recovery steam generator and then to atmosphere.

The primary zone 30 of the combustor 4 is supported by a support plate 28. The support plate 28 is attached to a cylinder 13 that extends from the shell 22 and encloses the primary zone 30. The secondary zone 32 is supported by arms (not shown) extending from the support plate 28. Separately supporting the primary and secondary zones 30 and 32 reduces thermal stresses due to differential thermal expansion.

Figure 2:
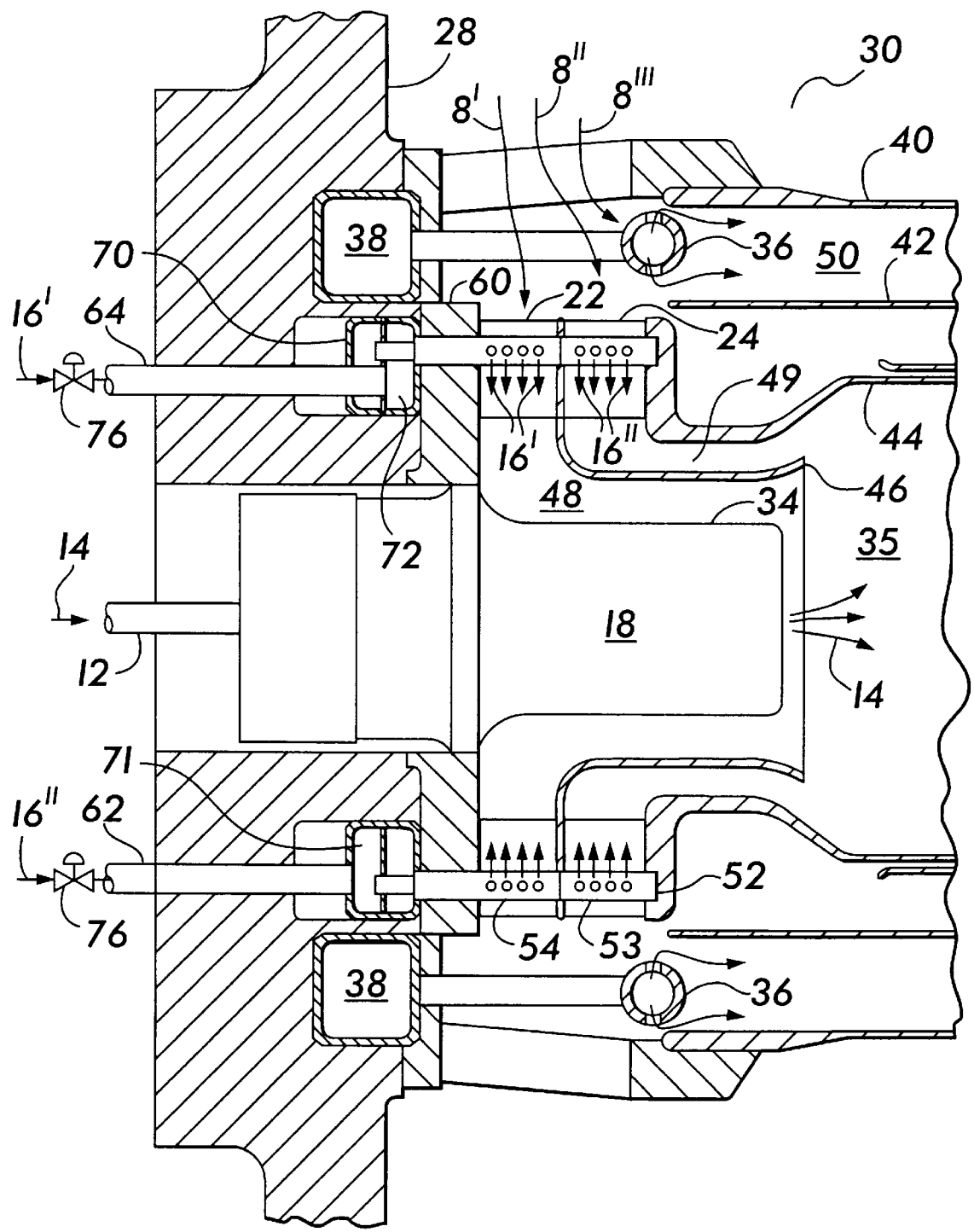
FIG. 2 is a longitudinal cross-section through the primary section of the combustor shown in FIG. 1.

Referring to FIG. 2, a primary combustion zone 35, in which a lean mixture of fuel and air is burned, is located within the primary zone 30 of the combustor 4. Specifically, the primary combustion zone 35 is enclosed by a cylindrical inner liner 44. The inner liner 44 is encircled by a cylindrical middle liner 42 that is, in turn, encircled by a cylindrical outer liner 40. The liners 40, 42 and 44 are concentrically arranged so that an annular secondary pre-mixing passage 50 is formed between the middle and outer liners 42 and 44, respectively. Secondary gas fuel is directed from a manifold 38 to an annular secondary gas fuel ring 36 that distributes gaseous fuel around the inlet to passage 50 into secondary combustion air 8'''. The fuel/air mixture produced by the secondary pre-mixing passage 50 is directed to a secondary combustion zone (not shown).

A fuel nozzle 18 is centrally disposed within the primary zone 30 and is supplied with oil fuel 14. In addition, the fuel nozzle 18 may be supplied with gaseous fuel and/or water for additional NOx control.

Compressed air from the compressor 2 is introduced into the primary combustion zone 35 by a primary air inlet formed in the front end of the primary zone 30. As shown in FIG. 2, the primary air inlet is formed by first and second primary pre-mixing passages 48 and 49 that divide the incoming air into two streams 8' and 8''. The first primary pre-mixing passage 48 has an upstream radial portion and a downstream axial portion. The upstream portion of the first passage 48 is formed between a radially extending circular plate 60 and the radially extending portion of a flow guide 46. The downstream portion is formed between the flow guide 46 and the outer sleeve 34 of the fuel nozzle 18 and is encircled by the second passage 49.

The second primary pre-mixing passage 49 also has an upstream radial portion and a downstream axial portion. The upstream portion of second passage 49 is formed between the radially extending portion of the flow guide 46 and a radially extending portion of the inner liner 44. The downstream portion of second passage 49 is formed between the axial portion of the flow guide 46 and an axially extending portion of the inner liner 44.

Figure 4:
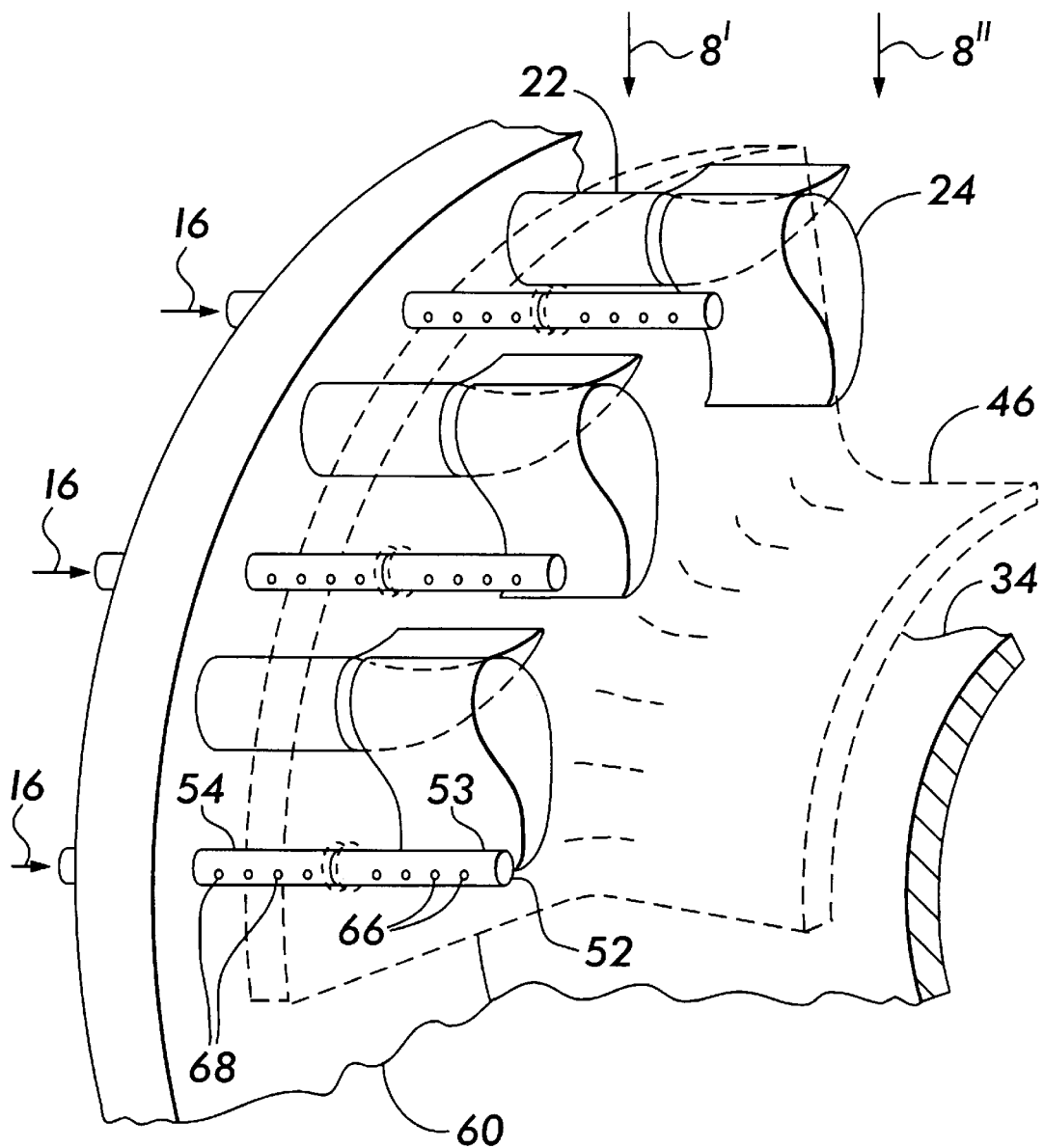
FIG. 4 is an isometric view of the air inlet portion of the combustor primary section shown in FIG. 2, with the flow guide shown in phantom for clarity.

As shown in FIGS. 2 and 4, a number of swirl vanes 22 and 24 are distributed around the circumference of the upstream portions of the primary pre-mixing passages 48 and 49. The swirl vanes 22 in the inlet of the first passage 48 impart a counterclockwise (when viewed in the direction of the axial flow) rotation to the air stream 8'. The swirl vanes 24 in the inlet of second passage 49 impart a clockwise rotation to the air stream 8''. The swirl imparted by the vanes 22 and 24 to the air streams 8' and 8'' ensures good mixing between fuel 16' and 16'' and the air, thereby eliminating locally fuel rich mixtures and the associated high temperatures that increase NOx generation.

As also shown in FIGS. 2 and 4, a number of axially oriented, primary fuel spray tube assemblies, or pegs, 52 are distributed around the circumference of the primary air inlet. The primary fuel tubes 52 serve to introduce fuel 16, which is preferably gaseous, into the first and second primary pre-mixing passages 48 and 49. Consequently, the primary fuel tubes 52 extend through the upstream portions of the both the first and second passages 48 and 49. Preferably, a primary fuel spray tube assembly 52 is located between each of the swirlers 22 and 24, as shown in FIG. 4.

As shown in FIG. 2, the primary fuel spray tube assemblies 52 are supplied with fuel 16 by a circumferentially extending tubular manifold 70 disposed within the support plate 28. As shown best in FIG. 5, the manifold 70 forms a hollow cavity that is divided into two chambers 71 and 72 by a circumferentially extending baffle 74. As shown in FIG. 2, separate fuel supply pipes 62 and 64 supply separate streams of fuel 16'' and 16', respectively, to chambers 71 and 72, respectively. A control valve 76 is installed in each of the fuel pipes 62 and 64 so that the flow rate of fuel 16' and 16'' can be separately regulated.

Figure 3:
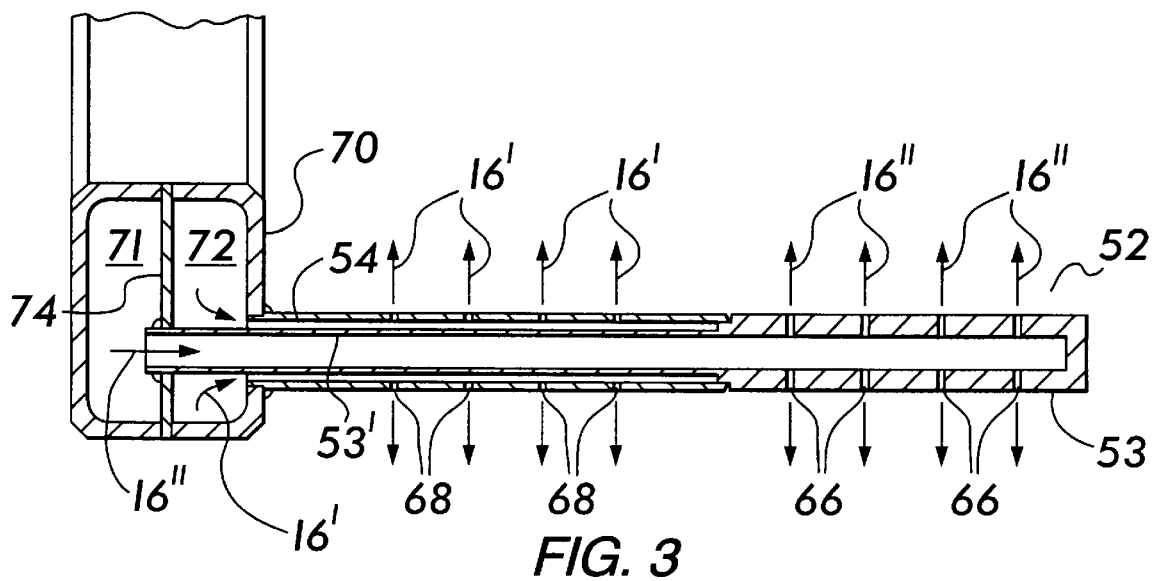
FIG. 3 is a longitudinal cross-section through the primary gas fuel tube assembly shown in FIG. 2.
Figure 5:
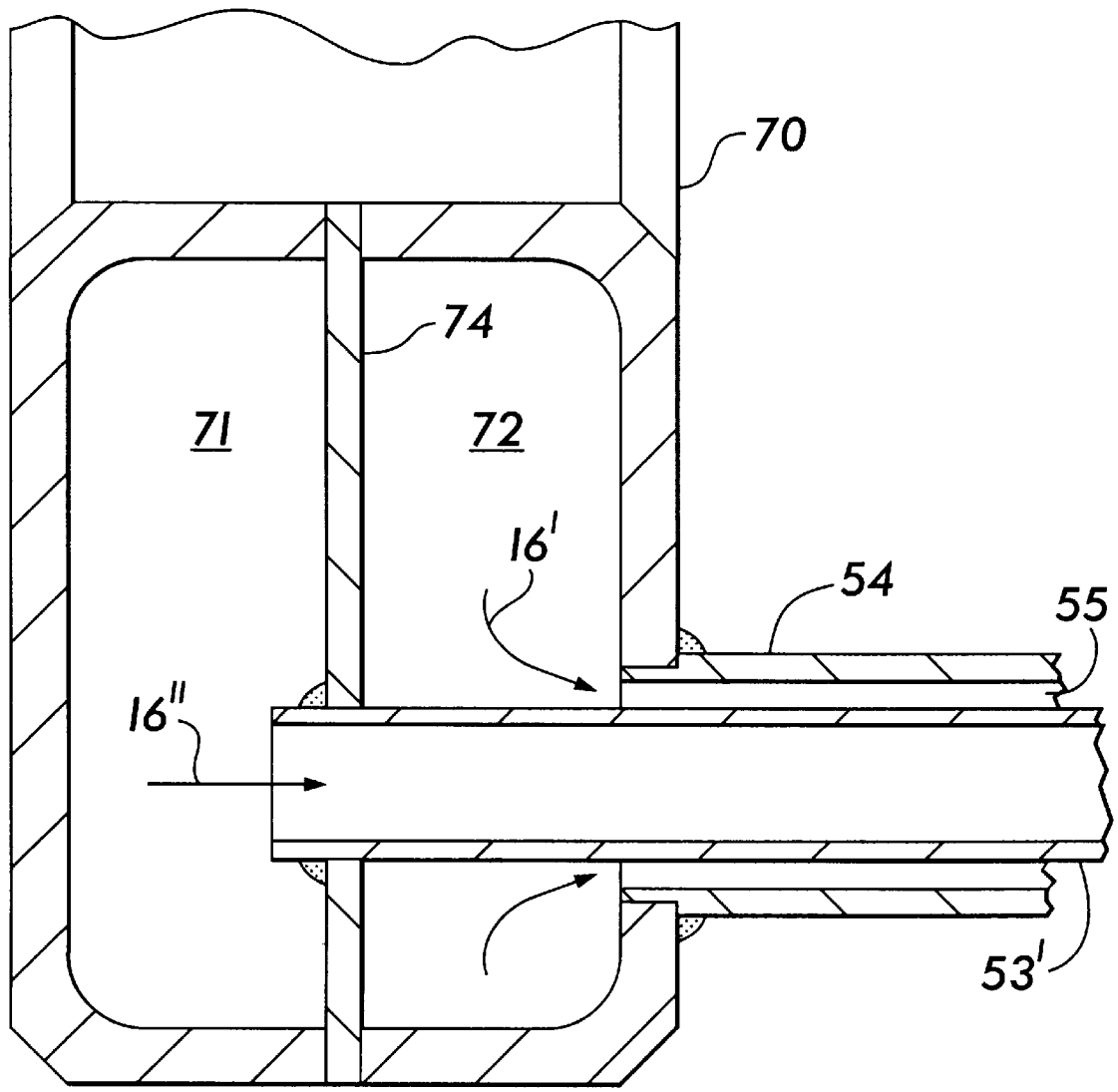
FIG. 5 is a detailed view of the primary gas fuel manifold shown in FIG. 3.

As shown best in FIGS. 3 and 5, each primary fuel spray tube 52 is an assembly comprised of two tubular members 53 and 54. Member 53 has two rows of fuel discharge ports 66 spaced along its length. Member 54 also has two rows of fuel discharge ports 68 spaced along its length. As shown in FIG. 2, member 54, and hence its fuel discharge ports 68, extends only through the first pre-mixing passage 48 so as to supply fuel 16' to only that passage. Although member 53 extends through both pre-mixing passages 48 and 49, its fuel discharge ports 66 are located in only the portion that extends through the second pre-mixing passage 49. Thus, member 53 supplies fuel 16'' to only the second pre-mixing passage 49. Preferably, the fuel discharge ports 66 and 68 are oriented so as to discharge the fuel circumferentially in the clockwise and counterclockwise directions within the inlets of pre-mixing passage 48 and 49.

As shown in FIG. 5, the proximal end of member 53 is attached, for example by welding, to the manifold baffle 74, through which it extends. The inlet of member 53 is thus in flow communication with the chamber 71 of the fuel manifold 70. The proximal end of member 54 is attached to the outer wall of the circumferentially extending manifold 70, through which it extends. As shown in FIG. 2, the distal end of member 53 terminates at the vertical flange of the liner 44.

As shown in FIGS. 3 and 5, member 53 has a reduced diameter portion 53' that extends through member 54. Consequently, an annular gap is formed between members 53 and 54 that forms a fuel passage 55. Fuel passage 55 is in flow communication with chamber 72 of the manifold 70, thereby supplying fuel 16'' to the discharge ports 68. The distal end of member 54 is attached, for example by welding, to member 53 so as to seal the end of the passage 55. Preferably, the joint along which the members 53 and 54 are joined is disposed within the passage in the vertical flange of the liner 46 through which the fuel tube assembly 52 extends.

The configuration of the primary fuel tubes 52 of the current invention has several advantages. First, since the fuel tube 53 for second pre-mixing passage 49 extends through the fuel tube 54 for the first pre-mixing passage 48, there is minimal obstruction of the flow area of the pre-mixing passages.

Second, since members 53 and 54 are supplied with fuel 16'' and 16' from separate chambers 71 and 72 to which the flow of fuel is separately controlled by valves 76, the fuel/air ratios in the two pre-mixing passages 48 and 49 can be individually controlled to optimize the combustion in the primary combustion zone 35.

Third, this arrangement minimizes stresses due to differential thermal expansion. Note that relatively cool fuel 16' and 16" flows over and through, respectively, the reduced diameter portion 53' of member 53, whereas much hotter air 8' flows over member 54, which surrounds the reduced diameter portion 53'. Consequently, member 54 will expand more than the reduced diameter portion 53' of the other member. According to the current invention, this differential growth is accommodated by the flexibility of the baffle 74, which can bend to accommodate growth, thereby reducing thermal stresses on the assembly.

The present invention may be embodied in other specific forms without departing from the spirit or essential attributes thereof and, accordingly, reference should be made to the appended claims, rather than to the foregoing specification, as indicating the scope of the invention.

We claim:

1. A combustor for combusting a flow of fuel in a flow of oxygen bearing fluid, comprising:
   a) first and second passages for mixing first and second portions of said fuel flow in first and second portions of said flow of oxygen bearing fluid, respectively, said first passage having an inlet for receiving said first portion of said oxygen bearing fluid flow, said second passage having an inlet for receiving said second portion of said oxygen bearing fluid flow;
   b) means for introducing said fuel flow into said first and second portions of said flow of oxygen bearing fluid, said fuel introducing means comprising a first member having rows of fuel discharge ports spaced along its length for introducing said first portion of said fuel flow into said first passage and a second member having rows of fuel discharge ports spaced along its length for introducing said second portion of said fuel flow into said second passage, said second member extending through said first member; and
   c) means for separately regulating the flow rate of said first portion of said fuel flow introduced by said first member and the flow rate of said second portion of said fuel flow introduced by said second member, whereby the flow of fuel can be individually regulated between the first and second passages to optimize combustion.

2. The combustor according to claim 1, further comprising a flow guide wall disposed between said first and second passages, and wherein at least one of said first and second members extends through said wall.

3. The combustor according to claim 1, wherein said first and second members form a fuel passage therebetween.

4. The combustor according to claim 1, wherein said first and second tubular members form an annular passage.

5. The combustor according to claim 4, wherein said fuel discharge ports in said first tubular member are in flow communication with said annular fuel passage.

6. The combustor according to claim 1, wherein said first and second members are substantially tubular, said second tubular member has a reduced diameter portion, said first tubular member encircling said reduced diameter portion of said second tubular member, said first member being capable of expanding more than the reduced diameter portion of the second member upon contact with hot oxygen bearing fluid, reducing thermal stresses on the assembly.

7. The combustor according to claim 1, wherein said fuel introducing means further comprises a plurality of additional first and second members, each of said additional second members extending through one of said additional first members, whereby each first member and its respective second member form a pair, each of said first and second members having a plurality of fuel discharge ports formed therein, each of said pairs of first and second members forming an annular passage that is in flow communication with said fuel discharge ports in its respective first member, and further comprising a manifold for distributing said first and second portions of said fuel to said first and second members, respectively, each of said annular passages in flow communication with said fuel manifold.

8. The combustor according to claim 7, wherein said fuel manifold has first and second portions, said annular passages in flow communication with said first manifold portion, said fuel discharge ports of said second members in flow communication with said second manifold portion, and further comprising means for separately regulating the flow of said fuel to said first and second portions of said manifold.

9. The combustor according to claim 1, where the first and second passages for mixing first and second portions of fuel flow are separated by a flow guide member.

10. A combustor for combusting a flow of fuel in a flow of oxygen bearing fluid, comprising:
   a) first and second passages for mixing first and second portions of said fuel flow in first and second portions of said flow of oxygen bearing fluid, respectively, said first passage having an inlet for receiving said first portion of said oxygen bearing fluid flow, said second passage having an inlet for receiving said second portion of said oxygen bearing fluid flow;
   b) means for introducing said fuel flow into said first and second portions of said flow of oxygen bearing fluid, said fuel introducing means comprising:
      i) a first member having rows of fuel discharge ports spaced along its length for introducing said first portion of said fuel flow into said first passage;
      ii) a second member having rows of fuel discharge ports spaced along its length for introducing said second portion of said fuel flow into said second passage, said second member extending through said first member;
      iii) a plurality of additional first members and a plurality of additional second members each of which extends through one of said additional first members, each of said first members dispersed about said first passage, each of said second members dispersed about said second passage;
      iv) a first chamber for distributing said first portion of said fuel flow to each of said first members and a second chamber for distributing said second portion of said fuel flow to each of said second members; and
   c) means for separately regulating the flow rate of said first portion of said fuel flow introduced by said first member and the flow rate of said second portion of said fuel flow introduced by said second member, so that the flow of fuel can be individually regulated between the first and second passages to optimize combustion.

11. The combustor according to claim 10, further comprising a manifold having a baffle disposed therein, said baffle dividing said manifold so as to form said first and second chambers.

12. The combustor according to claim 11, wherein said manifold comprises a circumferentially extending tubular member.

13. The combustor according to claim 11, wherein each of said first members has first and second ends, said first ends of each of said first members attached to said fuel manifold, said second ends of each of said first members attached to its respective second member.

14. The combustor according to claim 10, wherein each of said first and second members form a fuel passage therebetween, each of said fuel passages has an annular cross-section and surrounds at least a portion of its respective second member, whereby said fuel passages direct said first portion of said fuel flow to flow over said portions of said second members surrounded by said fuel passages, and where the first member surrounds a reduced diameter portion of the second member, said first member being capable of expanding more than the reduced diameter portion of the second member upon contact with hot oxygen bearing fluid, reducing thermal stresses on the assembly.

15. The combustor according to claim 10, further comprising a flow guide wall disposed between said first and second passages, and wherein at least one of said first and second members extends through said wall.

16. The combustor according to claim 10, where the first and second passages for mixing first and second portions of fuel flow are separated by a flow guide member.

17. A combustor for combusting a fuel in a flow of oxygen bearing fluid, comprising:
  a) first and second mixing passages for mixing first and second portions of said fuel in first and second portions of said flow of oxygen bearing fluid, respectively, said first mixing passage having an inlet for receiving said first portion of said oxygen bearing fluid flow, said second mixing passage having an inlet for receiving said second portion of said oxygen bearing fluid flow and said passages being separated by a flow guide wall;
  b) a plurality of first members dispersed around said first mixing passage, each of said first members having a plurality of fuel discharge ports formed therein;
  c) a plurality of second members dispersed around said second mixing passage, each of said second members having rows of a plurality of fuel discharge ports formed therein, each of said second members extending through a respective one of said first members so as to form a fuel passage, said fuel discharge ports of said first members in flow communication with said fuel passages; and
  d) a manifold for distributing said first and second portions of said fuel to said first and second members, respectively, each of said fuel passages formed by each of said first and second members having an inlet in flow communication with said manifold, means for separately regulating the flow of first and second portions of fuel, so that said fuel can be individually regulated between said first and second passages to optimize combustion.

18. The combustor according to claim 17, wherein said manifold comprises a shell, said shell forming a cavity, and further comprising a baffle dividing said cavity into first and second chambers, said fuel passage inlets of said first members in flow communication with said first chamber, said fuel inlet passages of said second members in flow communication with said second chamber.

19. The combustor according to claim 18, wherein said first members are attached to said shell, and said second members are attached to said baffle.

* * * * *